(12) United States Patent
Cupp et al.

(10) Patent No.: US 7,125,574 B2
(45) Date of Patent: *Oct. 24, 2006

(54) DENTAL DIET FOR REDUCING TARTAR

(75) Inventors: Carolyn Cupp, Liberty, MO (US); Lynn Ann Gerheart, Smithville, MO (US); Scott Schnell, St. Joseph, MO (US); Sheri Lynn Smithey, St. Joseph, MO (US); Donna Elizabeth Anderson, Weatherby Lake, MO (US); Dan Dixon, St. Joseph, MO (US)

(73) Assignee: Nestec S.A., Vevey (CH)

( * ) Notice: Subject to any disclaimer, the term of this patent is extended or adjusted under 35 U.S.C. 154(b) by 68 days.

This patent is subject to a terminal disclaimer.

(21) Appl. No.: 09/936,672

(22) PCT Filed: Jan. 10, 2001

(86) PCT No.: PCT/EP01/00307

§ 371 (c)(1),
(2), (4) Date: Jan. 23, 2002

(87) PCT Pub. No.: WO01/50882

PCT Pub. Date: Jul. 19, 2001

(65) Prior Publication Data

US 2003/0021872 A1  Jan. 30, 2003

(51) Int. Cl.
  *A01K 1/00*  (2006.01)

(52) U.S. Cl. .......................... 426/2; 426/623; 426/635; 426/805

(58) Field of Classification Search ................ 426/2, 426/805, 623, 635, 53, 54, 656, 658; 424/49
See application file for complete search history.

(56) References Cited

U.S. PATENT DOCUMENTS

| 4,800,099 | A | | 1/1989 | Gellman et al. ............ 426/641 |
| 5,000,940 | A | * | 3/1991 | Staples et al. ................ 424/49 |
| 5,407,661 | A | * | 4/1995 | Simone et al. ................ 424/49 |
| 5,431,927 | A | * | 7/1995 | Hand et al. ..................... 426/2 |
| 5,887,749 | A | * | 3/1999 | Schommer et al. .......... 220/575 |
| 6,254,920 | B1 | * | 7/2001 | Brunner ....................... 426/656 |
| 6,455,083 | B1 | * | 9/2002 | Wang ........................... 426/104 |

FOREIGN PATENT DOCUMENTS

| EP | 0 575 021 | | 12/1993 |
| EP | 000645095 A1 | * | 3/1995 |
| EP | 0 749 695 | | 12/1996 |

* cited by examiner

*Primary Examiner*—Keith Hendricks
(74) *Attorney, Agent, or Firm*—Bell, Boyd & Lloyd LLC

(57) ABSTRACT

A dried pet food which is able to mechanically clean the teeth of pets when chewed. The pet food is based on a matrix of a protein source and a carbohydrate source. The density of the product is less than 20.5 lbs./ft$^3$. The product also has a large size as compared to at least some other prior dried pet food.

31 Claims, 1 Drawing Sheet

DENTAL DIET FOR REDUCING TARTAR

RELATED APPLICATIONS

This application is a U.S. national phase application of International PCT/EP01/00307, filed Jan. 10, 2001, which claims priority to U.S. patent application Ser. No. 09/483,328, all of which are hereby incorporated by reference in their entirety.

BACKGROUND OF THE INVENTION

The present invention relates generally to pet foods. More specifically, the present invention relates to pet foods that when chewed by pets, cause a mechanical, abrasive cleaning of the pets' teeth.

Many pets suffer from dental health problems. It is estimated that over 70% of dogs have some degree of gingival or periodontal disease. Plaque formation on the surface of the pets' teeth is a primary factor in the development of such problems. Dental plaque is a combination of bacteria, bacterial by-products which form a glycoprotein matrix, and salivary precipitates which bind to the tooth surface.

Contributing to the problem is the formation of tartar or dental calculus (mineralized plaque). Dental calculus forms on the tooth surface at or above the gum line and serves as a substrate for the additional accumulation of plaque. Apart from causing gum irritation and potentially, periodontal disease if left untreated, this calculus has an unsightly appearance.

Pets are more susceptible to the formation of plaque and calculus than animals in the wild. This is due to the nature of the foods that pets eat. In the wild, many animals eat foods that mechanically abrade plaque and calculus from the teeth. In contrast, pets are usually fed commercially available pet foods that although they may provide better nutritional value, do not in general subject the teeth to abrasive forces sufficient to clean the teeth. This is even true of dried kibbles that are able to abrade the teeth only to a very limited extent. In part, this is due to the fact that dried kibbles usually crumble when chewed by the pet.

Maintenance of optimal dental health depends on regular professional cleaning of all these accumulations both above and below the gum line, as well as adequate home care. Mechanical cleansing of the tooth surfaces with tooth brushing is an effective means of controlling the buildup of plaque and calculus in both humans and pets. However, most pet owners are reluctant or unable to provide the routine brushing necessary to maintain good oral health in their pets and would likely welcome an alternative provided by dietary means.

There have been various attempts to provide products for improving pet dental health. One such attempt centers around the use of chews made from rawhide or rawhide substitutes. By allowing the pet to gnaw or chew on such rawhide products, the pet abrades calculus and plaque from its teeth. It is also possible, as described in European patent application 0272968, to incorporate various oral care agents into such chews. These products, however, have the drawback that they are typically expensive. Moreover, they are usually only effective with dogs that are prone to chew and gnaw.

Another approach has been to incorporate oral care agents into certain pet foods. For example, U.S. Pat. No. 5,000,940 discloses baked dog biscuits which contain a tetrasodium pyrophosphate salt. The patent states that the salt causes a reduction in calculus accumulation. Another example of such an approach is, European patent application 0205354 which discloses baked dog biscuits which contain vegetable fibers to abrade the teeth of the dog when chewed. A drawback with both of these products, however, is that the biscuits crumble upon being bitten. Hence, the dog cannot chew the product and little abrasion occurs. This thereby reduces the efficacy of the product.

A further approach is described in U.S. Pat. No. 5,431,927. That patent describes a dried product which contains aligned fibers which, when chewed, fracture in long striations rather than crumbling. The patent states that this allows the product to remain in contact with the animals' teeth for a longer period of time hence enhancing the abrasive effect. However, a disadvantage of this product is that it must be produced using a specially coated die that allows laminar flow conditions within the die. The laminar flow condition is reported to cause the alignment of the fibers within the product leading to the fracturing of the product when bitten by the animal. The use of such dies necessitates a complicated procedure for manufacturing the product.

There is therefore a need for an improved dental care pet food.

SUMMARY OF THE INVENTION

The present invention provides a dry pet food that will reduce tartar when chewed by the pet. It has been surprisingly found that by reducing the density and/or increasing the size of the pet food product, that the resultant product will remove more plaque and tartar build-up than similar pet food products.

To this end, in an embodiment the present invention provides a dried pet food comprising a matrix including a protein source, a carbohydrate source, an insoluble fiber, and having a density of less than 20.5 lbs/ft$^3$.

In a further embodiment of the present invention, a dried pet food is provided comprising a matrix including a protein source, a carbohydrate source, insoluble fiber and having a length of at least 15 mm, a width of at least 13.5 mm, and a thickness of at least 12 mm.

In a still further embodiment of the present invention, a dried pet food is provided comprising a matrix including a protein source, a carbohydrate source, insoluble fiber, a density of less than 20.5 lbs/ft$^3$, and dimensioned so as to have a length of at least 15 mm, a width of at least 13.5 mm, and a thickness of at least 12 mm.

In yet another embodiment of the present invention, a dried pet food is provided comprising at least 25% by weight of a kibble including a matrix having a protein source, carbohydrate source, insoluble fiber, and a density of less than 20.5 lbs/ft$^3$.

In an embodiment of any of the above inventions, the protein source comprises denatured protein.

In an embodiment of any of the above inventions, the carbohydrate source comprises gelatinized carbohydrate.

In an embodiment of any of the above inventions, the insoluble fiber comprises approximately 2% to about 15% by weight of the matrix.

In an embodiment of any of the above inventions, the insoluble fiber may be a cellulose fiber.

In an embodiment of any of the above inventions, the product may include a humectant.

Methods of reducing calculus and plaque on pets' teeth are also provided. To this end, in an embodiment, a method of reducing calculus and plaque build-up on a pet's teeth is provided comprising the step of allowing the pet to chew on dried pet food having a matrix including a protein source, a carbohydrate source, insoluble fiber, and having a density of less than 20.5 lb/ft$^3$.

An advantage of the present invention is to provide an improved pet food for reducing tartar on pets' teeth.

Another advantage of the present invention is to provide an improved dental care pet food for dogs.

A still further advantage of the present invention is to provide an improved dental care product that can be mixed with regular pet food and still achieve dental health care benefits for the pet.

Moreover, an advantage of the present invention is to provide a dried pet food that does not require the use of a humectant.

Furthermore, an advantage of the present invention is to provide an improved method for making dried pet food that provides dental benefits.

Further, an advantage of the present invention is to provide a cost effective method for improving the dental health of pets.

Additional features and advantages of the present invention are described in and will be apparent from the detailed description of the presently preferred embodiments set forth below.

DETAILED DESCRIPTION OF THE PRESENTLY PREFERRED EMBODIMENTS

Figure 1:
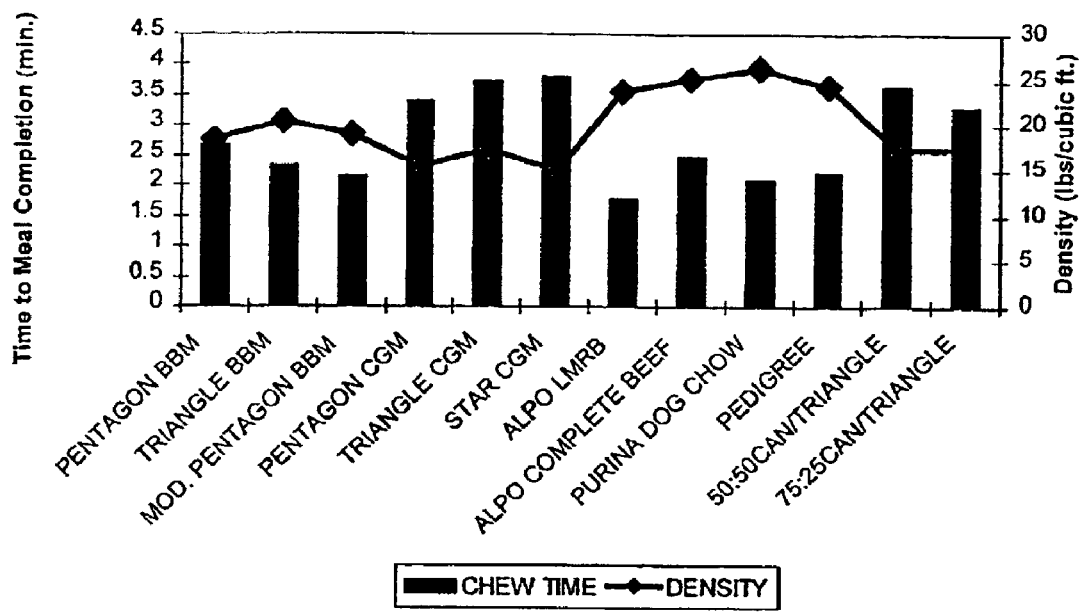
FIG. 1 is a graph showing a comparison of chewing time of the inventive product with chewing times of currently available products.

The present invention relates generally to dried pet food for cleaning pets' teeth. It has been surprisingly found that by reducing the density of dried pet food and/or providing a larger product, that an improved tartar removing product can be provided for pets. This is true even if the product does not include a texturizing agent (humectant).

In a preferred embodiment, the present invention provides a dried pet food comprising a matrix including a denatured protein source, a gelatinized carbohydrate source, and insoluble fiber. Preferably, the pet food has a density of approximately 15.6 lb/ft$^3$ (250 kg/m$^3$) to about 20.5 lb/ft$^3$ (330 kg/m$^3$), in an embodiment, approximately 16.8 lb/ft$^3$ (270 kg/m$^3$) to 20 lb/ft$^3$ (320 kg/m$^3$). Furthermore, preferably the pet food is dimensional such that it has a length of at least 15 mm, a width of at least 13.5 mm, and a thickness of at least 12 mm. In an embodiment, the pet food has a length of approximately 20 mm, a width of at least 15 mm, and a thickness of at least 18 mm. The pet food may alternatively be provided in kibble shapes such as triangles, pentagons and stars. An example of a triangle kibble has the following dimensions: thickness 16 mm, base 28 mm and sides 32 mm. An example of a pentagon has a diameter of 22.8 mm and a thickness of 14.2 mm.

Preferably, the pet food has a texture such that a probe, having a contact area of about 1 mm$^2$ and operated at a speed of about 5 mm/s, penetrates into the matrix for a distance of at least about 30% of the thickness of the matrix prior to breaking the matrix, more preferably at least about 40%. For example, for a dog food, the probe may penetrate a distance of approximately 6.0 mm, preferably at least 6.5 mm, prior to breaking the matrix.

The carbohydrate source is conveniently a grain such as corn, rice, wheat, beets, barley, oats, or soy, and/or mixtures of these grains. The grain is typically provided in the form of a flour or a meal. Pure or substantially pure starches may also be used if desired. The exact carbohydrate source or sources used in the present invention is not critical to the invention. Generally, the carbohydrate source is selected on the basis of cost and palatability. It should be noted that the carbohydrate source may or may not contain protein. In a preferred embodiment, the dried pet food contains approximately 20% to about 65% by weight of carbohydrate.

A variety of protein sources can be used for the protein component. The protein source may be a vegetable protein source, an animal protein source, or a mixture of these protein sources. Suitable vegetable protein sources include gluten, wheat protein, soy protein, rice protein, corn protein, and the like. These proteins can be provided in the form of flours, concentrates, and isolates, as desired. Suitable animal protein sources include muscular or skeletal meat of mammals, poultry, and fish; meals such as meat meal, bone meal, fish meal, and poultry meal; by-products such as hearts, liver, kidneys, tongue, and the like; and milk proteins. Preferably, the dried pet food contains approximately 12% to about 50% by weight proteins, and in a most preferred embodiment, more than about 15% to 40% by weight protein. The dried food may contain a mixture of protein sources, for example, corn gluten meal and beef and bone meal. It is found to be advantageous to include corn gluten meal at about 15–20% together with beef and bone meal at 3–10% to obtain the desired density of the final product. The protein sources may also include soy bean meal. A preferred range for soy bean meal is from only 5% to 15%, more preferably 6–8% of the total composition of the food mix formulation.

The insoluble fiber may be any suitable fiber. By way of example, suitable fibers include soy fiber, rice hull fiber, pea hull fiber, oat hull fiber, barley hull fiber, sugarbeet fiber, wheat bran fiber, and pure cellulose. One such cellulose fiber is Solka-Floc®. Generally, the fiber is selected on the basis of cost and palatability considerations. However, as noted above, the product should have a density less than 20.5 lb/ft$^3$. Accordingly, a fiber must be selected which results in a lower density product. Accordingly, a cellulose fiber may be used in a preferred embodiment. If used, preferably, the dried pet food contains approximately 2% to about 15% by weight of insoluble fiber.

As noted above, a texturizing agent is not necessary. However, if a texurizing agent is desired, a humectant may be provided. The humectant may be any suitable humectant, for example, glycerin, propolyne glycol, butylene glycol, polyhydric glycols such as glycerol and sorbitol, hydrogenated starch, hydrolysates and the like. If used, the dried pet food can contain up to 5% by weight humectant.

If desired, abrasive agents may also be included. Suitable abrasive agents include ground oyster shells, titanium dioxide, and the like. Similarly dental care agents may also be used if desired; for example, pyrophosphate salts such as tetrasodium pyrophosphate.

Various other ingredients, for example, salt, spices, seasonings, vitamins, minerals, flavoring agents, lipids, and the like may also be incorporated into the dried pet product as desired. If added, the lipids may be any suitable animal fat; for example tallow, or may be a vegetable fat.

The dried pet food may be manufactured in many different ways as desired. However extrusion gelatinization is found to be particularly suitable.

In a specific example of a suitable extrusion gelatinization process, a dry feed mixture is prepared from a protein source, a carbohydrate source, insoluble fiber, vitamins, and minerals. The dry feed mixture is then fed into a preconditioner.

In the preconditioner, water or steam, or both, is mixed into the dry feed mixture. Further, liquid flavor components, such as flavor digests or tallow, may be mixed into the dry feed mix in the preconditioner. Sufficient water, steam, or liquid flavor components is mixed into the feed mixture to raise the moisture content of the dry feed mixture to approximately 10% to about 30% by weight. If desired, the temperature of the dry feed mixture may be raised in the preconditioner to approximately 60° C. to about 95° C. A suitable preconditioner is described in U.S. Pat. No. 4,752,139.

The moistened feed leaving the preconditioner is then fed into an extruder. If the product will include a humectant, the humectant is conveniently added to the moistened feed in the extruder. The extruder may be any suitable single or twin screw, cooking-extruder. Suitable extruders may be obtained from Wenger Manufacturing Inc., Clextral S A, Bühler A G, and the like. During passage through the extruder, the moistened feed passes through a cooking zone, in which it is subjected to mechanical shear and is heated to a maximum temperature of up to about 130° C., and a forming zone. The gauge pressure in the forming zone is approximately 600 kPa to about 10 Mpa as desired. If desired, water or steam, or both, may be introduced into the cooking zone. Further, during passage through the extruder, the starch ingredients of the moistened feed are gelatinized to provide a gelatinized matrix of starch, protein, insoluble fiber, and humectant.

The gelatinized matrix leaving the extruder is forced through a die. Any suitable die may be used. However, the orifice of the die is preferably chosen such that the distance from the center of the orifice to any inner surface is at least about 5 mm. This ensures that the extrudate has a diameter of at least about 18 mm; more preferably at least about 20 mm. Further, the orifice is preferably shaped to provide a product kibble having at least one corner. Suitable examples of shapes are found to include triangles, pentagons and stars.

Upon leaving the die, the extrudate is cut into pieces using blades. The blades are preferably arranged such that the pieces have a length of at least about 12 mm; for example about 14 mm. The individual pieces may then be processed as desired. For example, they may be partially or fully dried and coated with further flavoring agents. After cooling, the pieces may be packed into suitable packages.

After drying, the pieces preferably have a moisture content of less than about 10% by weight; for example about 3% to about 7% by weight when leaving the drier. The pieces preferably have a water activity of less than about 0.7; more preferably less than about 0.6.

It has been found that the dry dog food kibbles of the invention require increased chewing time by the pet, assisting in the increasing of the dental benefits to be derived from the food. It is also noted that the length of chewing bouts increases, providing exercise for jaw muscles. This is believed to contribute to improved oral health.

By way of example, and not limitation, examples of the present invention will now be given.

EXAMPLE NO. 1A

A dry mix is prepared from about 62% by weight of whole corn, about 16% by weight of beef and bone meal, about 14% soybean meal, about 4% by weight of fish and poultry meals, and about 3% by weight of cellulose and various vitamins and minerals. The dry mix is fed into a preconditioner along with a flavor digest. The preconditioned mixture is then fed into an extruder with or without about 2% by weight of glycerin. The preconditioner is operated at about 87° C. Steam is injected into the preconditioner at about 9% DMR and water at about 4% DMR The moistened feed leaving the preconditioner is then fed into a model 165 extruder obtained from Wenger and gelatinized. The extruder has six zones and the temperatures in the six zones are about 87° C., about 87° C., about 102° C., about 101° C., about 102° C., and about 127° C. The pressure upon leaving the extruder is about 3.4 MPa gauge.

The gelatinized mixture is forced through the orifice of a die. The orifice is in the shape of a circle in cross section with a diameter of 10 mm. The extrudate leaving the die is cut into pieces of 14 mm length. The pieces are then coated with flavoring agents and dried in the normal manner.

The pieces have a density of about 328 kg/m$^3$ and a moisture content of about 8.5% by weight.

EXAMPLE NO. 1B

A second dry mix is prepared and extrusion cooked, cut and flavor coated as described above in Example 1A to produce a second pet food, except that instead of having the beef and bone meal of Example 1A, the dry mix contains 16% by weight of corn gluten meal. The product had a density of about 280 kg/m$^3$.

EXAMPLE NO. 2

An amount of 50 dried pieces obtained using the process of Example 1A are subjected to texture analysis using a TA-XT2 Texture Analyzer obtained from Stable Micro Systems, Inc. The Texture Analyzer is fitted with a rod-like probe which has a length of about 52 mm. The probe is made up of two sections; a first section and a second section. The first section has a length of about 21 mm and a constant diameter of about 9.5 mm. The second section tapers down to a point having a contact area of about 1 mm$^2$. The Texture Analyzer is operated at a speed of 5 mm/s and a contact force of 5 g.

Each piece is placed on a base under the probe. The probe is moved downwardly and into the piece. The distance of penetration of the probe into the piece, the compression force and the time are recorded at a rate of 200 recordings per second. Breakage of the piece is determined upon a sharp fall off of the compression force. The distance of penetration, the compression force and the time are recorded at the moment of breakage. The values obtained for all pieces are then averaged.

For comparison, the process is repeated for each group of 50 pieces of products used in the dental trial (Example 3). The results are as follows:

| Product | Distance to breakage/mm |
| --- | --- |
| Example 1A | 6.56 |
| Example 1B | 9.50 |
| Purina Dog Chow | 3.30 |

The results indicate that the pieces of Examples No. 1A and 1B are significantly better than standard dry dog foods.

Because the products of Examples 1A and 1B are resistant to breakage, the animal needs to bite deeper into each piece of the product before it breaks. Therefore the animal's teeth are subjected to improved mechanical cleaning.

EXAMPLE NO. 3

A group of 36 healthy adult dogs are used in this trial. Each animal is given a complete veterinary physical examination. Oral exams are also conducted to select only dogs without obvious dental/oral problems. The dogs are divided into three groups of 12 dogs each with an even distribution of age, sex, and susceptibility to calculus formation in each group. During the trial, the dogs have ad libitum access to water and food and are fed once daily. The food consumption of each dog is monitored daily. The weight of each dog is recorded at the start of the trial and again each week.

The trial is initiated by performing complete dental prophylaxis on all dogs to carefully remove (by ultrasonic teeth cleaning) all supra- and sub-gingival deposits of plaque and calculus. Also, the dogs' teeth are thoroughly polished. Each group of dogs is then randomly allocated a different food product and fed that product for the duration of the trial. Group 1 is fed the pieces of Example No. 1A, Group 2 is fed the second dental prototype of Example No. 1B, and Group 3 is fed Purina Dog Chow.

After 7 days of feeding, dogs are sedated and a few drops of a 3% erythrosin plaque-disclosing solution are applied to the teeth of each dog and then thoroughly rinsed off with tap water. Plaque evaluation is then carried out on gingival and occlusal halves of the upper third incisors, upper and lower canines, upper $3^{rd}$ and $4^{th}$ premolars, upper first molars, lower $3^{rd}$ and $4^{th}$ premolars, and lower first molars. An assessment of the buccal tooth surface that is covered with plaque is made according to the following scale:
  0=No observable plaque;
  1=Plaque covering less than 25% of the tooth surface;
  2=Plaque covering between 25% and 50% of the tooth surface;
  3=Plaque covering between 50(% and 75% of the tooth surface;
  4=Plaque covering greater than 75% of the tooth surface.

Plaque thickness is assessed as follows:
  1=Light or thin, a light pink color;
  2=Medium, a moderate or medium shade of red;
  3=Heavy or thick, a dark bright shade of red.

A score is then obtained by multiplying the coverage score by the thickness score for each half of the 14 teeth to give a score ranging from 0 to 12. The score for each half of a tooth are added to provide a whole tooth score. The whole tooth scores are then averaged.

On the $21^{st}$ day of the trial, evaluation of calculus is similarly performed for each animal on the proximal, mesial, and distal thirds of the 18 teeth previously examined. No disclosing solution is used to score calculus. The scores for each third of a tooth are added to provide a whole tooth score and all whole tooth scores are averaged. Concurrent with calculus scoring, a gingival index is performed in which one score is recorded per tooth based on the most severe portion of the tooth's gingival margin. Gingival index is assessed as follows:
  0=No inflammation or swelling;
  1=Mild inflammation, slight redness or swelling, no bleeding on gentle probing;
  2=Moderate inflammation, redness and swelling, bleeding on gentle probing;
  3=Severe inflammation, bright red and swollen gingiva, spontaneous bleeding on probing.

Scores for all animals in each group are averaged and the results are as follows:

| Product | Plaque Score Day 7 | Calculus Score Day 21 | Gingival Index Day 21 |
|---|---|---|---|
| Example 1A Dental | 6.45 | 3.87 | 0.24 |
| Example 1B Dental | 6.93 | 4.06 | 0.24 |
| Purina Dog Chow | 7.79 | 5.33 | 0.46 |

The results indicate that the products of Example No. 1 show significantly improved cleaning of the dogs' teeth over a commercially available dry dog food. These results correlate with those of Example No. 2.

EXAMPLE NO. 4

A group of 36 healthy adult dogs are used in this trial. Each animal is given a complete veterinary physical examination. Oral exams are also conducted to select only dogs without obvious dental/oral problems. The dogs are divided into three groups of 12 dogs each with an even distribution of age, sex, and susceptibility to calculus formation in each group. During the trial, the dogs have ad libitum access to water and food and are fed once daily. The food consumption of each dog is monitored daily. The weight of each dog is recorded at the start of the trial and again each week.

The trial is initiated by performing complete dental prophylaxis on all dogs to carefully remove (by ultrasonic teeth cleaning) all supra-and sub-gingival deposits of plaque and calculus. Also, the dogs' teeth are thoroughly polished. Each group of dogs is then randomly allocated a different food product and fed that product for the duration of the trial. Group 1 is fed the pieces of Example No. 1B, in a 50:50 blend with standard-sized Alpo Complete pieces. Group 2 is fed the pieces of Example No. 1B, in a 25:75 blend with standard-sized Alpo Complete pieces (25% dental pieces). Group 3 is fed standard Alpo Complete dry dog food.

Plaque, calculus, and gingival scores are performed as in Example No. 3.

Scores for all animals in each group are averaged and the results are as follows:

| Product | Plaque Score Day 7 | Calculus Score Day 21 | Gingival Index Day 21 |
|---|---|---|---|
| 50% Dental | 7.69 | 3.29 | 0.45 |
| 25% Dental | 7.39 | 2.97 | 0.46 |
| Alpo Complete | 8.56 | 5.36 | 0.56 |

The results indicate that the two test products show significantly improved cleaning of the dogs' teeth over standard dry dog food.

EXAMPLE NO. 5

Fifty dried pieces obtained using the inventive products of Example 4 were subjected to texture analysis as described in Example 2.

For comparison, the process is performed for each group of 50 pieces of dry products used in the dental trial (Example 4). The results are as follows:

| Product | Distance to Breakage/mm |
| --- | --- |
| ALPO Complete (nugget) | 2.1 |
| ALPO Complete (bone) | 1.2 |
| Example 4 (large pieces) (density of 19.9 lbs/ft$^3$) | 6.7 |
| Example 4 (small pieces) (density of 20.2 lbs/ft$^3$) | 2.3 |

The results indicate that the large pieces of Example 4 are significantly better than standard dried pet foods.

Because the products of Examples 1 and 4 are resistant to breakage, the animal needs to bite deeper into each piece of the product before it breaks. Therefore the animal's teeth are subjected to improved mechanical cleaning.

EXAMPLE NO. 6

Eleven dogs (Labradors and beagles) are selected for a chewing time trial. Each day, a predetermined quantity of food is given to each dog, according to its individual metabolic/activity needs. Each day the food is different and the meal is individually timed to determine the time to completion by a particular participating dog. The different food meals and chewing times are shown in the accompanying graph, FIG. 1.

The formulations for the test diets are the following:
a. High beef and bone meal (BBM) formula, comprising 16% w/w beef and bone meal, 61.8% w/w corn, and being free of corn gluten meal, provided as kibbles having a pentagonal shape;
b. High beef and bone meal (BBM) formula, comprising 16% w/w beef and bone meal, 61.8% w/w corn, and being free of corn gluten meal, provided as kibbles having a triangular shape;
c. High beef and bone meal (BBM) formula, comprising 16% w/w beef and bone meal, 61.8% w/w corn, and being free of corn gluten meal, provided as kibbles having a modified (rounded corner) pentagonal shape;
d. High corn gluten meal (CGM) formula, comprising 16% w/w corn gluten meal, 61.8% w/w corn, and being free of beef and bone meal, provided as kibbles having a triangular shape;
e. High corn gluten meal (CGM) formula, comprising 16% w/w corn gluten meal, 61.8% w/w corn, and being free of beef and bone meal, provided as kibbles having a star shape;
f. High corn gluten meal (CGM) formula, comprising 16% w/w corn gluten meal, 61.8% w/w corn, and being free of beef and bone meal, provided as kibbles having a star shape;
g. Purina Dog Chow (available from the Ralston Purina company, USA);
h. Pedigree dog food;
i. The CGM formula above in kibbles having a triangle shape, but being mixed with standard ALPO puppy chunk and gravy product at ratio of 50% dry: 50% canned;
j. CGM formula triangle shape mixed with standard ALPO puppy chunk and gravy product at ratio of 75% canned: 25% dry; and The same 11 dogs ate all products on consecutive days.

It was noted that the lower density food products had the longest chewing times, that standard dry products had the fastest chewing times, and that mixing the large triangle piece with canned food also resulted in extended chewing. See FIG. 1.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A dried pet food comprising a matrix comprising a humectant, a protein source, a carbohydrate source, insoluble fiber, and an agent selected from the group consisting of abrasive agents, dental care agents and combinations thereof, and having a length of at least 15 mm, a width of at least 13.5 mm, and a thickness of at least 12 mm and a density of not greater than 18 lbs/ft$^3$, wherein the dried pet food comprises a moisture content of not greater than 7% by weight.

2. The dried pet food of claim 1 wherein the protein source comprises denatured protein.

3. The dried pet food of claim 1 wherein the carbohydrate source comprises gelatinized carbohydrate.

4. The dried pet food of claim 1 wherein the insoluble fiber comprises approximately 2% to about 15% by weight of the matrix.

5. The dried pet food of claim 1 wherein the insoluble fiber is a cellulose fiber.

6. A dried pet food comprising a matrix comprising a humectant, a protein source, a carbohydrate source, an insoluble fiber, and an agent selected from the group consisting of abrasive agents, dental care agents and combinations thereof, and comprising a density of not greater than 20.0 lbs/ft$^3$, wherein the dried pet food comprises a moisture content of not greater than 7% by weight.

7. The dried pet food of claim 6 wherein the protein source comprises denatured protein.

8. The dried pet food of claim 6 wherein the carbohydrate source comprises gelatinized carbohydrate.

9. The dried pet food of claim 6 wherein the insoluble fiber comprises approximately 2% to about 15% by weight of the matrix.

10. The dried pet food of claim 6 wherein the insoluble fiber is a cellulose fiber.

11. A dried pet food comprising a matrix comprising a humectant, a protein source, a carbohydrate source, insoluble fiber, a density of not greater than 20.0 lbs/ft$^3$, and an agent selected from the group consisting of abrasive agents, dental care agents and combinations thereof, and comprising a length of at least 15 mm, a width of at least 13.5 mm, and a thickness of at least 12 mm, wherein the dried pet food comprises a moisture content of not greater than 7% by weight.

12. The dried pet food of claim 11 wherein the protein source comprises denatured protein.

13. The dried pet food of claim 11 wherein the carbohydrate source comprises gelatinized carbohydrate.

14. The dried pet food of claim 11 wherein the insoluble fiber comprises approximately 2% to about 15% by weight of the matrix.

15. A dried pet food comprising at least 25% by weight of a kibble comprising a matrix comprising a humectant, a protein source, a carbohydrate source, insoluble fiber, and an agent selected from the group consisting of abrasive agents, dental care agents and combinations thereof, and a density of less than 20.5 lbs/ft³, wherein the dried pet food comprises a moisture content of not greater than 7% by weight.

16. The dried pet food of claim 15 wherein the matrix comprises a length of at least 15 mm, a width of at least 13.5 mm, and a thickness of at least 12 mm.

17. A method of reducing calculus and plaque build-up on a pet's teeth comprising the step of administering to a pet a dried pet food comprising a matrix comprising a humectant, a protein source, a carbohydrate source, insoluble fiber, and an agent selected from the group consisting of abrasive agents, dental care agents and combinations thereof, and comprising a density of not greater than 20.0 lbs/ft³ wherein the pet chews the dried pet food, wherein the dried pet food comprises a moisture content of not greater than 7% by weight.

18. A method according to claim 17 including the step of providing the pet food as a kibble comprising a shape selected from the group consisting of a triangle, a pentagon and a star.

19. A method according to claim 17 comprising mixing the dried pet food with a wet pet food.

20. A method according to claim 19 wherein the ratio of wet pet food to dry pet food is at least 50:50.

21. A dried pet food according to claim 1 comprising a body in a shape chosen from the group consisting of a triangle, pentagon, and star.

22. A dried pet food according to claim 1 comprising corn gluten meal as a protein source.

23. A dried pet food according to claim 6 comprising a body in a shape chosen from the group consisting of a triangle, pentagon, and star.

24. A dried pet food according to claim 6 comprising corn gluten meal as a protein source.

25. A dried pet food according to claim 6 comprising a density of 18 lbs/ft³ or less.

26. A dried pet food according to claim 11 comprising a body in a shape chosen from the group consisting of a triangle, pentagon, and star.

27. A dried pet food according to claim 11 comprising corn gluten meal as a protein source.

28. A dried pet food according to claim 11 comprising a density of 18 lbs/ft³ or less.

29. A dried pet food according to claim 15 comprising a body in a shape chosen from the group consisting of a triangle, pentagon, and star.

30. A dried pet food according to claim 15 comprising corn gluten meal as a protein source.

31. A dried pet food according to claim 15 comprising a density of 18 lbs/ft³ or less.

* * * * *